Patented July 20, 1937

2,087,878

UNITED STATES PATENT OFFICE 2,087,878

METHOD OF MANUFACTURING SHOES

Walter H. Wedger, Belmont, Mass., assignor to B. B. Chemical Co., Boston, Mass., a corporation of Massachusetts No Drawing. Application November 16, 1936, Serial No. 111,066

5 Claims. (Cl. 12—142)

This invention relates to shoe manufacture and more particularly to the permanent attaching of outsoles to shoe uppers by means of polymerized chloroprene.

In United States Letters Patent No. 2,061,296, granted November 17, 1936, upon my application, Serial No. 25, filed January 2, 1935, I have described a process of attaching outsoles to shoe uppers by means of polymerized chloroprene. The present invention is directed to certain improvements in said process which make it possible to apply the polymerized chloroprene adhesive to the outsoles considerably in advance of the outsole-attaching operation and then to store the outsoles until needed, and which make it unnecessary to carry out conforming and tempering operations on the outsoles prior to the application of adhesive thereto.

In the aforementioned patent I have described a process wherein the outsole and the shoe upper are brought together under sole-attaching pressure while the polymerized chloroprene previously applied to said shoe parts is in adhesive condition, which may be from about 1 to 6 hours or more after the application of the polymerized chloroprene cement. In the practice of such process, the sole-cementing and other shoe factory operations must be timed within reasonably close limits in order that the cement on the outsoles may be in an adhesive condition when the uppers are ready for outsole attaching. Furthermore, with such process it is usually necessary to see that the outsoles are attached during the same working day that they are coated with cement, because ordinarily the adhesiveness of the cement thereon is considerably reduced after the cement-coated outsoles have stood overnight.

Further, in connection with the process described in my said copending application Serial No. 25, (now Patent No. 2,061,296), I have also found that the strength of bond obtainable is greatly reduced if water is permitted to contact with the surface of the polymerized chloroprene cement on the outsole prior to the sole-attaching operation. Such water contact occurs, for example, when a cement-coated outsole is dipped in water in connection with sole-conforming or tempering. This phenomenon of reducing the strength of bond occurs even though the water or moisture has disappeared from the surface of the cement at the time of the attaching operation, and even though the parts are brought together for attachment within the normal period of adhesiveness of the cement.

In the accomplishment of the above and other objects, I have provided by the present invention an outsole-attaching method wherein polymerized chloroprene, on an outsole, which has lost its adhesiveness in substantial degree by long standing or by subjection to water is temporarily restored to normal adhesiveness and the operation of attaching the outsole to the shoe upper performed while the outsole is in such condition of temporary restoration to adhesiveness.

According to the present invention, this temporary restoration to normal adhesiveness is accomplished by applying to the surface of the polymerized chloroprene cement on the outsole, before said polymerized chloroprene has become entirely cured, a material which will swell plastic polymerized chloroprene. Then, when the polymerized chloroprene is in attaching condition, that is to say, when excess or a major portion of the swelling material has been dissipated but the plastic polymer is still in swelled condition, the outsole and shoe upper are brought into juxtaposition and placed under attaching pressure.

The material for swelling the polymerized chloroprene cement may be selected from the solvents for plastic polymerized chloroprene, for example, benzene, trichloroethylene, xylene, propylene oxide, carbon tetrachloride, etc., such solvents being of a wide range of volatility. The swelling agent selected for any given instance will depend in part upon the sequence of, and desired time intervals between, the shoe factory operations employed in the particular case.

In accordance with a feature of the invention, I have discovered that by applying a swelling agent consisting, for example, of 95% propylene oxide and 5% benzene, to the surface of relatively non-adhesive polymerized chloroprene cement on an outsole, said polymerized chloroprene is temporarily restored to attaching condition almost immediately, that is to say, within 5 to 60 seconds, and that within this period the outsole and shoe upper may be brought into juxtaposition and placed under attaching pressure to form a bond of high adhesive strength. Moreover, the attaching pressure need be maintained for only a very short time, for example, from about 40 to 60 seconds. Where a longer period of temporary restoration of adhesiveness to the polymerized chloroprene cement on the outsole is desired, I have discovered that by applying benzene to the cement on the outsole the adhesiveness thereof is restored within the period of about 5 minutes to about 2 hours after the application of the benzene thereto. If the outsole and shoe upper are brought into juxtaposition and placed under attaching pressure within this period a bond of high adhesive strength is obtained and the sole-attaching pressure need be maintained for not more than 15 to 60 seconds.

In carrying out this invention in a preferred manner the attaching surfaces of the shoe upper and outsole are mechanically prepared for sole-attaching. Thus, the overlasted portion of the shoe upper and the marginal portion of the sole are roughened or scoured such as by an emery wheel or a wire brush.

While the sole is in dry condition, that is to say, not in temper, a polymerized chloroprene adhesive composition may be applied to the roughened marginal portions of the shank and forepart of the sole in one application in the form of a strip or ribbon of suitable width by a sole-cementing machine such, for example, as that disclosed in United States Letters Patent No. 2,073,647, granted March 16, 1937, upon an application filed in the name of Carl A. Newhall. The adhesive may of course be brushed on by hand, or applied in any other suitable manner. The adhesive composition consists essentially of plastic polymerized chloroprene, preferably malodorant-free polymerized chloroprene, dissolved in a suitable solvent, for example, equal parts of benzene and trichloroethylene. The thus applied composition preferably contains no accelerator and becomes anchored to the substance of the outsole. The cement thus applied to the outsole may then be permitted to dry for a substantial period of time, for example, from 1 to 48 hours, and in some instances for periods upwards of a week, during which period a major proportion, or even substantially all of the solvent may be evaporated. The sole may then be dipped into water and shortly thereafter molded or conformed to a predetermined shape similar to that of the shoe bottom to which it is to be applied, for example, in a conforming machine such as disclosed in United States Letters Patent No. 2,020,344, granted November 12, 1935, on an application filed in the name of Erastus E. Winkley. Thereafter, the conformed sole may be placed in a mulling or tempering cabinet wherein the wet leather of the sole comes into mulled or tempered condition. If desired, instead of tempering the leather immediately after the conforming operation the sole may be permitted to dry out and the leather tempered later.

In either event, before the polymerized chloroprene on the sole has become cured or completely polymerized, said polymerized chloroprene is temporarily restored to a high state of adhesiveness in which it will adhere under pressure to another adhesive surface of plastic polymerized chloroprene.

Prior to the temporary restoration of adhesiveness to the polymerized chloroprene on the outsole, a solution of polymerized chloroprene is applied to the overlasted margin of the upper, whereby the polymerized chloroprene becomes securely anchored in the substance thereof. This may be accomplished by hand, or in a single layer by mechanical means such as disclosed in an application for United States Letters Patent, Serial No. 754,648, filed November 24, 1934, in the name of Wilbur L. MacKenzie. The polymerized chloroprene adhesive which is applied to the attaching surface of the upper may be and preferably is of substantially the same composition as that applied to the outsole. By way of example, in the case of the composition referred to above, the polymerized chloroprene applied to the shoe upper is in tacky or adhesive condition for the purposes of this invention after a drying period of about an hour and up to about 6 or more hours. The adhesive may, therefore, be applied to the attaching surfaces of the shoe upper from about 1 to 8 hours prior to the time that it is desired to attach the outsole to the upper.

During the period in which the polymerized chloroprene adhesive on the shoe upper is in attaching condition, in accordance with the present invention, the polymerized chloroprene cement on the outsole is temporarily restored to adhesiveness. This may be accomplished by applying to the cement upon the outsole a volatile swelling agent or solvent of polymerized chloroprene which may consist, for example, of 5% benzene and 95% propylene oxide. An accelerator of curing of polymerized chloroprene, such as that known commercially as "duPont Accelerator #808", and which is a butyraldehyde aniline condensation product, may be associated with this swelling agent in the proportion of about 5 cc. of accelerator to 1000 cc. of the benzene, propylene oxide mixture. While the swelling agent may be applied to the cemented surface of the outsole by hand or by brush, it is conveniently applied by means of a solvent applying machine, such as disclosed in Patent No. 2,073,647, hereinbefore referred to. The polymerized chloroprene on the outsole so treated is temporarily restored to optimum adhesiveness for a period of about 5 seconds to about 1 minute after the application of the swelling agent thereto. Within this period the outsole and the shoe bottom are brought into juxtaposition, whereupon they are immediately placed under sole-attaching pressure which may preferably be of the order of 80 pounds per square inch.

The outsole and shoe upper are preferably maintained under sole-attaching pressure for at least 40 to 60 seconds, and this may be accomplished conveniently in a machine such as shown in United States Letters Patent No. 2,047,185, granted July 14, 1936, upon an application filed in the name of Milton H. Ballard et al.

When a greater interval of time is desired between the application of the swelling agent and the application of sole-attaching pressure, the polymerized chloroprene cement on the outsole may be treated with benzene. In such case the cement on the outsole is in a condition of restored adhesiveness for a period of from about 5 minutes to about 2 hours after the application of the benzene. During this period of restored adhesiveness the outsole and shoe upper are brought into juxtaposition and placed under sole-attaching pressure.

As previously stated, the adhesive composition preferably employed in carrying out this invention consists essentially of a solution of plastic polymerized chloroprene in a suitable solvent. The polymerized chloroprene preferably is malodorant-free. Additionally, there may be present in the composition ingredients to modify and improve the characteristics thereof as well as to eccelerate the later curing or more complete polymerization of the chloroprene. A specific example of a preferred composition is as follows:

| | |
|---|---|
| Plastic polymerized chloroprene (deodorized) | 907 grams |
| Magnesium oxide | 91 grams |
| Zinc oxide | 46 grams |
| Sulphur | 27 grams |
| Monoethanolamine | 30 grams |
| Diethylamine | 23 grams |
| Benzene | 1656 cc. |
| Trichloroethylene | 1656 cc. |
| (Yield—1 gallon) | |

The above composition which is disclosed and claimed per se in a copending application, Serial No. 117,902, filed December 28, 1936, in the name of A. D. Macdonald, may be prepared by milling together one-half of the polymerized chloroprene with three-quarters of the magnesium oxide, all of the zinc oxide, and one-half of the monoethanolamine, and then separately milling the remainder of the polymerized chloroprene, magnesium oxide and one-sixth of the monoethanolamine. The separately milled batches may then be dissolved in a mixture of the solvents at which time the balance of the monoethanolamine and the diethylamine and sulphur may be incorporated.

In the above composition the polymerized chloroprene is, of course, the adhesive material. Preferably, the polymerized chloroprene is malodorant-free which may be prepared, for example, by deodorizing commercial plastic polymerized chloroprene in the manner set forth in United States Letters Patent No. 2,067,854, granted January 12, 1937, upon an application filed in the name of A. D. Macdonald. The magnesium oxide serves, at least in part, to neutralize any hydrochloric acid which may be set free in the polymerized chloroprene and also to prevent scorching when zinc oxide and polymerized chloroprene are milled together. The zinc oxide appears to assist in the later curing or more complete polymerization of the plastic polymer. The sulphur appears to assist in the later curing of the polymer. The monoethanolamine and diethylamine function as stabilizers to inhibit premature curing of the polymer. The benzene and trichloroethylene function, of course, as solvents for the polymerized chloroprene and associated materials.

It is to be understood that the above composition is given merely by way of specific example and that the invention is in no way limited thereto. Thus, the composition might consist merely of polymerized chloroprene and a solvent therefor. The magnesium and zinc oxides and sulphur might be omitted or replaced with equivalent materials. Where keeping qualities are not important the monoethanolamine and diethylamine might be omitted. Other solvents may be employed in place of benzene or trichloroethylene or in association therewith, for example, carbon tetrachloride, toluene, xylene.

It will be noted that according to a preferred form of the invention the resulting shoe structure is free from any malodorant characteristics which otherwise might limit the use of the invention. The invention, however, is not limited to the use of polymerized chloroprene which has been rendered malodorant-free, and polymerized chloroprene of the ordinary malodorant type may also be used in cases where the malodorant characteristics thereof are not objectionable.

A form of polymerized chloroprene suitable for the purposes of this invention is the synthetic rubber-like material known commercially as "DuPrene", and which may be made by polymerizing chloroprene in the manner set forth in United States Letters Patent No. 1,950,436, granted March 13, 1934, upon an application of Ira Williams. The chloroprene itself may be made in the manner described in United States Letters Patent No. 1,950,431, granted March 13, 1934, upon an application of W. H. Carothers and A. M. Collins. So far as applicable to the purposes of this invention, other haloprenes are to be considered as equivalents of chloroprene, for example, bromoprene, described in said Patent No. 1,950,431. Malodorant-free polymerized chloroprene, and a method of deodorizing "DuPrene" are disclosed in Patent No. 2,067,854, hereinbefore referred to.

While I have disclosed in particular the attaching of leather outsoles to shoe uppers, it will be understood that the invention in certain of its aspects is also applicable to the attaching of outsoles made of materials other than leather. The shoe uppers may be of leather or of any other suitable material.

Having described my invention, what I claim as new and desire to secure by Letters Patent of the United States is:

1. The method of attaching an outsole to a shoe upper which comprises anchoring polymerized chloroprene to the attaching surface of an outsole and permitting said polymer to dry to such an extent that its adhesiveness to a similarly coated surface is greatly reduced, anchoring polymerized chloroprene to the attaching surface of a shoe upper and permitting said polymer to dry to such an extent that it is readily adhesive to a similarly coated surface, and while the polymer-coated surface of the upper is still in adhesive condition and before the polymer on the outsole has become cured, applying a swelling agent to the polymerized chloroprene on the outsole, permitting the major portion of said swelling agent to dissipate, and then pressing said outsole and shoe together with the cemented surfaces in juxtaposition.

2. The method of attaching an outsole to a shoe upper which comprises anchoring malodorant-free plastic polymerized chloroprene to the attaching surface of an outsole, permitting said polymer to stand for such a time that its adhesiveness under pressure to a similarly coated surface is materially reduced, anchoring malodorant-free plastic polymerized chloroprene to the attaching surface of a shoe upper, and while the polymer on said shoe upper is still in highly adhesive condition and before the polymer on the outsole has become entirely cured, applying a swelling agent to the polymerized chloroprene on the outsole, and while said polymer on the outsole is in a condition of temporary restoration to adhesiveness, pressing said outsole and shoe upper together with the polymerized chloroprene surfaces in juxtaposition.

3. The method of attaching a leather outsole to a shoe upper which comprises anchoring plastic polymerized chloroprene to the attaching surface of said outsole while said outsole is in air-dry condition, permitting water to contact with said outsole and associated polymerized chloroprene as in a sole-conforming or sole-tempering operation, anchoring plastic polymerized chloroprene to the attaching surface of a shoe upper, applying a swelling agent to the polymerized chloroprene on the outsole, and while the polymerized chloroprene surfaces on the upper and outsole are in a highly adhesive condition pressing said outsole and shoe upper together with the cemented surfaces in juxtaposition.

4. The method of attaching a leather outsole to a shoe upper which comprises applying a solution of polymerized chloroprene to the attaching surface of a leather outsole, allowing the major portion of the solvent to evaporate, dipping the outsole in water, shaping the wet outsole and while the outsole is in temper and before the polymerized chloroprene on the outsole has become cured, applying a relatively volatile swelling agent to the polymerized chloroprene on the outsole and while the cement on the outsole is in temporarily restored adhesive condition bringing said outsole into juxtaposition with a shoe bottom whose attaching surface is provided with an adhesive layer of polymerized chloroprene, and pressing the outsole and shoe upper firmly together.

5. The method of attaching a leather outsole to a shoe upper which comprises applying a solution of polymerized chloroprene to the attaching surface of a leather outsole, permitting said cement to dry to a substantial extent, dipping the outsole in water, imparting a predetermined shape to the wet outsole, tempering the leather of the shaped outsole, applying a solution of polymerized chloroprene to the attaching surface of a shoe upper, permitting the major portion of the solvent to evaporate and before the polymerized chloroprene on the outsole has become cured applying a relatively volatile swelling agent to the cement-coated surface of the outsole, and then, while the cement-coated surfaces of the upper and outsole are in a condition in which they are adhesive to similar coated surfaces, pressing said outsole and shoe upper together with the cemented surfaces in juxtaposition.

WALTER H. WEDGER.